(12) United States Patent
Lin et al.

(10) Patent No.: US 11,659,288 B2
(45) Date of Patent: May 23, 2023

(54) IMAGE SENSING DEVICE WITH ADJUSTABLE PARAMETERS FOR IMAGE SAMPLING

(71) Applicant: SunASIC Technologies, Inc., Taipei (TW)

(72) Inventors: Chi-Chou Lin, Taipei (TW); Zheng-Ping He, Taipei (TW)

(73) Assignee: SunASIC Technologies, Inc., Taipei (TW)

( * ) Notice: Subject to any disclaimer, the term of this patent is extended or adjusted under 35 U.S.C. 154(b) by 251 days.

(21) Appl. No.: 17/076,908

(22) Filed: Oct. 22, 2020

(65) Prior Publication Data

US 2022/0132053 A1    Apr. 28, 2022

(51) Int. Cl.
*H04N 25/75* (2023.01)
*G06V 40/13* (2022.01)
*H04N 25/42* (2023.01)
*H04N 25/44* (2023.01)
*H04N 25/50* (2023.01)
*H04N 25/57* (2023.01)
*H04N 25/59* (2023.01)
*H04N 25/70* (2023.01)
(Continued)

(52) U.S. Cl.
CPC ......... *H04N 25/44* (2023.01); *G06V 40/1306* (2022.01); *H04N 25/40* (2023.01); *H04N 25/42* (2023.01); *H04N 25/50* (2023.01); *H04N 25/51* (2023.01); *H04N 25/57* (2023.01); *H04N 25/59* (2023.01); *H04N 25/70* (2023.01); *H04N 25/75* (2023.01); *H04N 25/77* (2023.01); *H04N 25/78* (2023.01); *G06V 10/993* (2022.01)

(58) Field of Classification Search
CPC ........ H04N 5/378; H04N 5/351; H04N 5/355; H04N 5/3559; H04N 5/341; H04N 5/345; H04N 5/369; H04N 25/40; H04N 25/44; H04N 25/50; H04N 25/51; H04N 25/57; H04N 25/75; H04N 25/77; H04N 25/78
See application file for complete search history.

(56) References Cited

U.S. PATENT DOCUMENTS

2008/0252742 A1* 10/2008 Oike .................... H04N 5/3591
348/222.1
2014/0362269 A1* 12/2014 Omori .................... H04N 25/70
348/308

(Continued)

*Primary Examiner* — David N Werner
(74) *Attorney, Agent, or Firm* — Demian K. Jackson; Jackson IPG PLLC (57) ABSTRACT

An image sensing device that can adjust parameters of an image before sending it to a processor for reducing computing power and/or storage requirement is disclosed. The image sensing device includes an array of sensing pixels; an output amplifier; an analog-to-digital converter; a first set of registers and a second set of registers; an activation circuit; and a profiling logic. The profiling logic conducts statistical analysis on output data and adjusts parameters stored in the first set of registers until results of the statistical analysis reaches a target standard, wherein the adjusted parameters are used to generate an output image by each sensing pixel of the array of sensing pixels once the target standard is reached and a notification signal is sent to an external device for notifying the failure of parameter adjustment if the target standard fails to be reached within a predetermined times of adjustment.

10 Claims, 9 Drawing Sheets

(51) Int. Cl.
  *H04N 25/40*  (2023.01)
  *H04N 25/77*  (2023.01)
  *H04N 25/78*  (2023.01)
  *H04N 25/51*  (2023.01)
  *G06V 10/98*  (2022.01)

(56)  References Cited

U.S. PATENT DOCUMENTS

2018/0084210 A1* 3/2018 Chida ................ H04N 9/04515
2018/0167570 A1* 6/2018 Suh ...................... H04N 5/3745
2018/0184018 A1* 6/2018 Itano ...................... H04N 5/355
2019/0124277 A1* 4/2019 Mabuchi ................... B60R 1/00
2020/0390344 A1* 12/2020 Park ...................... H04N 25/44

* cited by examiner

IMAGE SENSING DEVICE WITH ADJUSTABLE PARAMETERS FOR IMAGE SAMPLING

FIELD OF THE INVENTION

The present invention relates to an image sensing device. More specifically, the present invention relates to an image sensing device that can adjust parameters of an image before sending it to a processor.

BACKGROUND OF THE INVENTION

Image quality affects the processing speed and correctness of many applications, such as biometric authentication or object detection. Conventional image processing systems acquire an image or a series of images from an image sensing device and then running an image quality assessment algorithm on a processor to determine whether the image is acceptable for the system before processing the image(s). If the image quality is not satisfactory, the system re-acquires the image(s) until it is acceptable. The assessment and the re-acquirement step consume a lot of computing power, primarily when multiple re-acquirements occur.

To reduce the requirement of computing power of an image processing system, a new design of the image sensing device that can adjust the parameters of an image before sending it to the processor.

SUMMARY OF THE INVENTION

This paragraph extracts and compiles some features of the present invention; other features will be disclosed in the follow-up paragraphs. It is intended to cover various modifications and similar arrangements included within the spirit and scope of the appended claims.

In order to settle the problems mentioned above, an image sensing device that can adjust parameters of an image before sending it to a processor is disclosed. The image sensing device includes an array of sensing pixels; an output amplifier, connected to the array of sensing pixels, for amplifying a measurement signal of each sensing pixel of the array of sensing pixels; an analog-to-digital converter (ADC), connected to the output amplifier, for converting the amplified measurement signal of each sensing pixel of the array of sensing pixels into a digital data; a first set of registers, for storing parameters to operate the image sensing device that control the output amplifier; a second set of registers, connected to the ADC, for storing the digital data converted by the ADC; an activation circuit, connected between the array of sensing pixels and the output amplifier, for controlling output sequence of the array of sensing pixels, including a selective activation circuit to selectively enable an output of a subset of the array of sensing pixels; and a profiling logic, connected to the first and second sets of registers, for conducting statistical analysis on output data from the subset of the array of sensing pixels, and adjusting the parameters stored in the first set of registers until results of the statistical analysis reaches a target standard, wherein the adjusted parameters are used to generate an output image by each sensing pixel of the array of sensing pixels once the target standard is reached and a notification signal is sent to an external device for notifying the failure of parameter adjustment if the target standard fails to be reached within a predetermined times of adjustment.

Preferably, the measurement signal of each sensing pixel represents an electric potential or an electric current thereof.

Preferably, the parameters to control the output amplifier are gain and offset.

Preferably, the subset of the array of sensing pixels is a sub-sampling of the array of sensing pixels.

Preferably, the selective activation circuit corresponding to the subset of the array of sensing pixels is controlled by a mode select signal.

Preferably, the activation circuit comprises a plurality of selective basic units and a plurality of normal basic units.

Preferably, each of the plurality of selective basic units and the plurality of normal basic units comprises a flip-flop and at least one multiplexer.

Preferably, the image sensing device switches between normal and selective modes through the mode select signal.

Preferably, multiple selective modes are provided corresponding to respective specified subsets of the array of sensing pixels, and each mode is activated by a corresponding mode select signal.

Preferably, the image sensing device further comprises an I/O interface for communicating with the external device.

Preferably, the image sensing device is a fingerprint sensor.

Preferably, the fingerprint sensor is a capacitive fingerprint sensor.

DETAILED DESCRIPTION OF THE PREFERRED EMBODIMENTS

The present invention will now be described more specifically with reference to the following embodiments.

Figure 1:
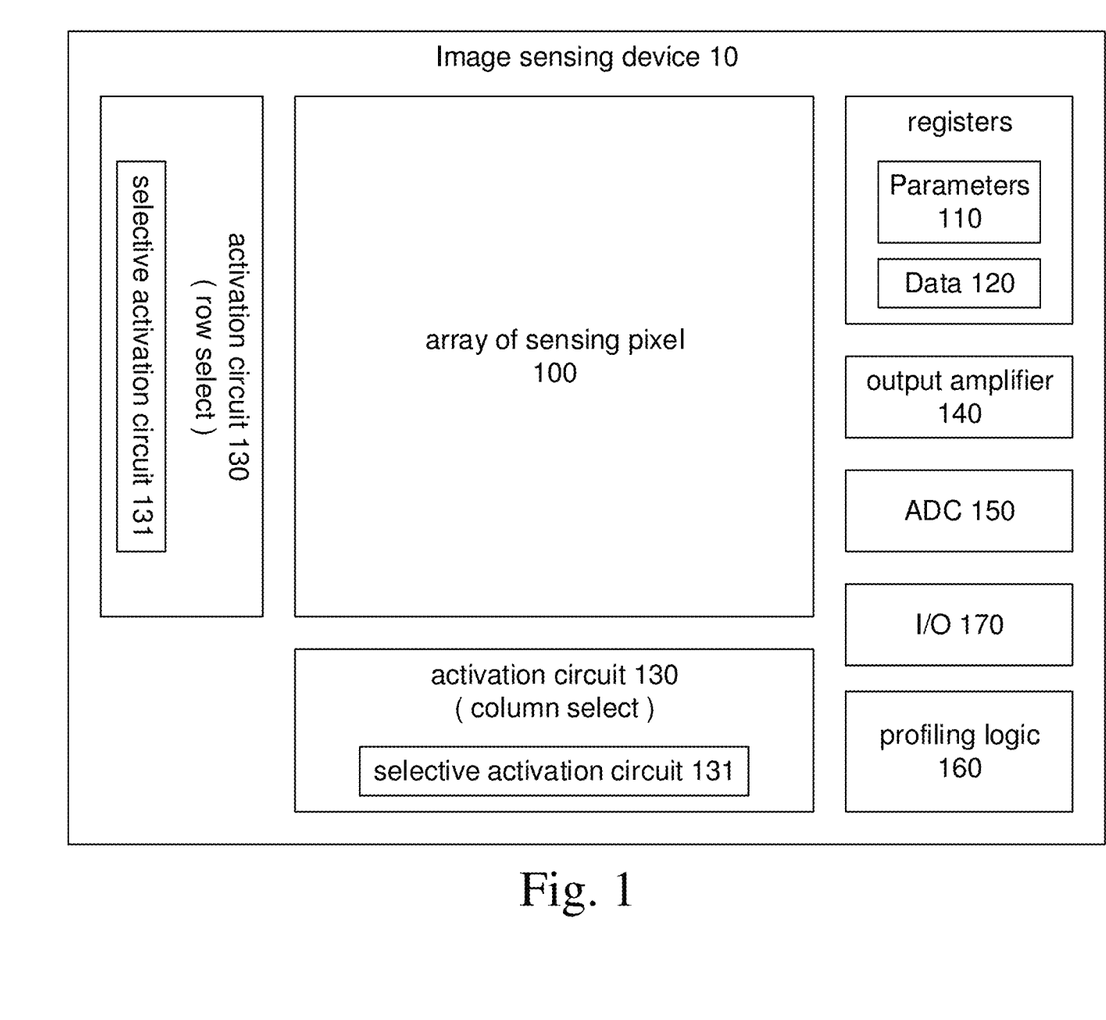
FIG. 1 is a block diagram of an image sensing device according to the present invention.

FIG. 1 is a block diagram of an image sensing device 10 according to the present invention. The image sensing device 10 is used to acquire an image while specific requirements are satisfied. The requirements are given according to the usage of the image sensing device 10, which will be described in later paragraphs. The image sensing device 10 includes: an array of sensing pixels 100, a first set of registers 110, a second set of registers 120, an activation circuit 130, an output amplifier 140, an analog-to-digital converter (ADC) 150, and a profiling logic 160.

The array of sensing pixels 100 may be a photoactive region of a Charge-Coupled Device (CCD), a Complementary Metal Oxide Semiconductor (CMOS) image sensor, or a sensing array of a capacitive image sensor. The first set of registers 110 are used to store the parameters to operate the image sensing device 10, and the second set of registers 120 are used to store data of a sensing result of the image sensing device 10. The activation circuit 130 is used to control the output sequence of the array of sensing pixels 100. Unlike conventional image sensors, the activation circuit 130 includes a selective activation circuit 131 that can selectively enable a subset of the array of sensing pixels 100, or a subset of the output nodes of the array. In other words, only the portion (the subset) of the image sensing device 10 will be activated and generate data while the selective activation circuit 131 is enabled. To simplify the description, hereinafter, the image sensing device 10 enters "selective mode" when the selective activation circuit 131 is enabled; otherwise, it is called "normal mode." The "selective mode" implies that only a selected set of pixels are enabled during the image acquisition process. The ADC 150 is connected to the array of sensing pixels via the activation circuit 130, and is used to convert a measurement signal of each pixel into the digital data. The second set of registers 120 is connected to the ADC 150 for storing the digital data converted by the ADC. The measurement signal may be electric potential or electric current produced by the sensing pixel, depending on the type of the image sensing device 10. The amplitude and reference of the measurement signal can be adjusted by setting the parameters, e.g., gain and offset (level shift), that control the output amplifier 140 before the conversion. These parameters are part of the parameters stored in the first set of registers 110. When the "selective mode" is active, the profiling logic 160 receives output data from the subset of the array of sensing pixels and calculates a set of statistics based on the output data. Then, the profiling logic 160 may adjust the parameters stored in the first set of registers according to the statistics until the statistics of a newly acquired selected pixels fall into a predetermined range or the number of trials exceeds a limitation. If the requirements defined by the statistic method are satisfied, i.e., the set of statistics are in a predetermined range, the image sensing device 10 enters "normal mode" to generate an output image under the adjusted parameters. Otherwise, if the selective mode acquisition has been attempted for too many times, the image sensing device 10 may send a signal to inform an external device (not shown) that acquisition has failed. The image sensing device 10 may further include an input/output interface (I/O) 170 to communicate with the external device.

Figure 2:
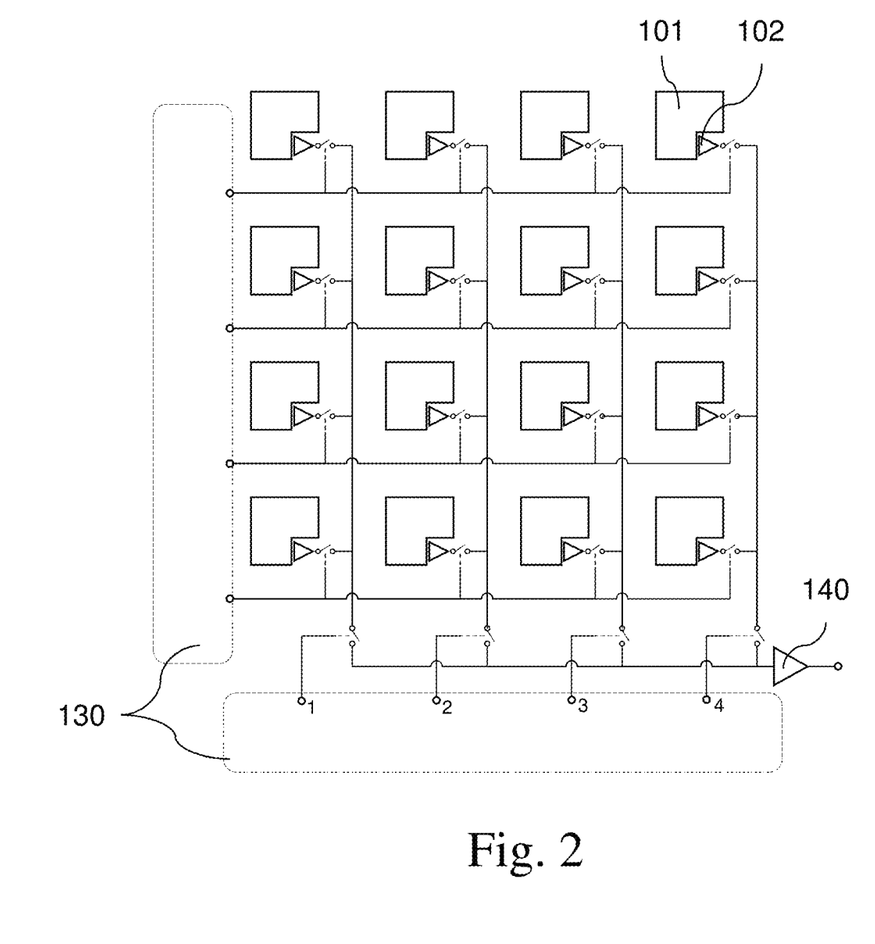
FIG. 2 is a simplified block diagram of the array of sensing pixels and the output amplifier.

Please refer to FIG. 2. FIG. 2 is a simplified block diagram of the array of sensing pixels 100 and the output amplifier 140. In the present embodiment, the image sensing device 10 is a Complementary Metal Oxide Semiconductor (CMOS) image sensor. There are 16 (4×4) sensing pixels 101 shown in FIG. 2. Each sensing pixel 101 includes a conversion amplifier 102 for converting charge to voltage of that pixel. The measurement signals produced by the array of sensing pixels 100 are multiplexed by a set of row select and column select that are connected to the activation circuit. The activation circuit 130 can control the output sequence of the array of sensing pixels 100 or the output sequence of a subset of the array of sensing pixels 100.

Figure 3:
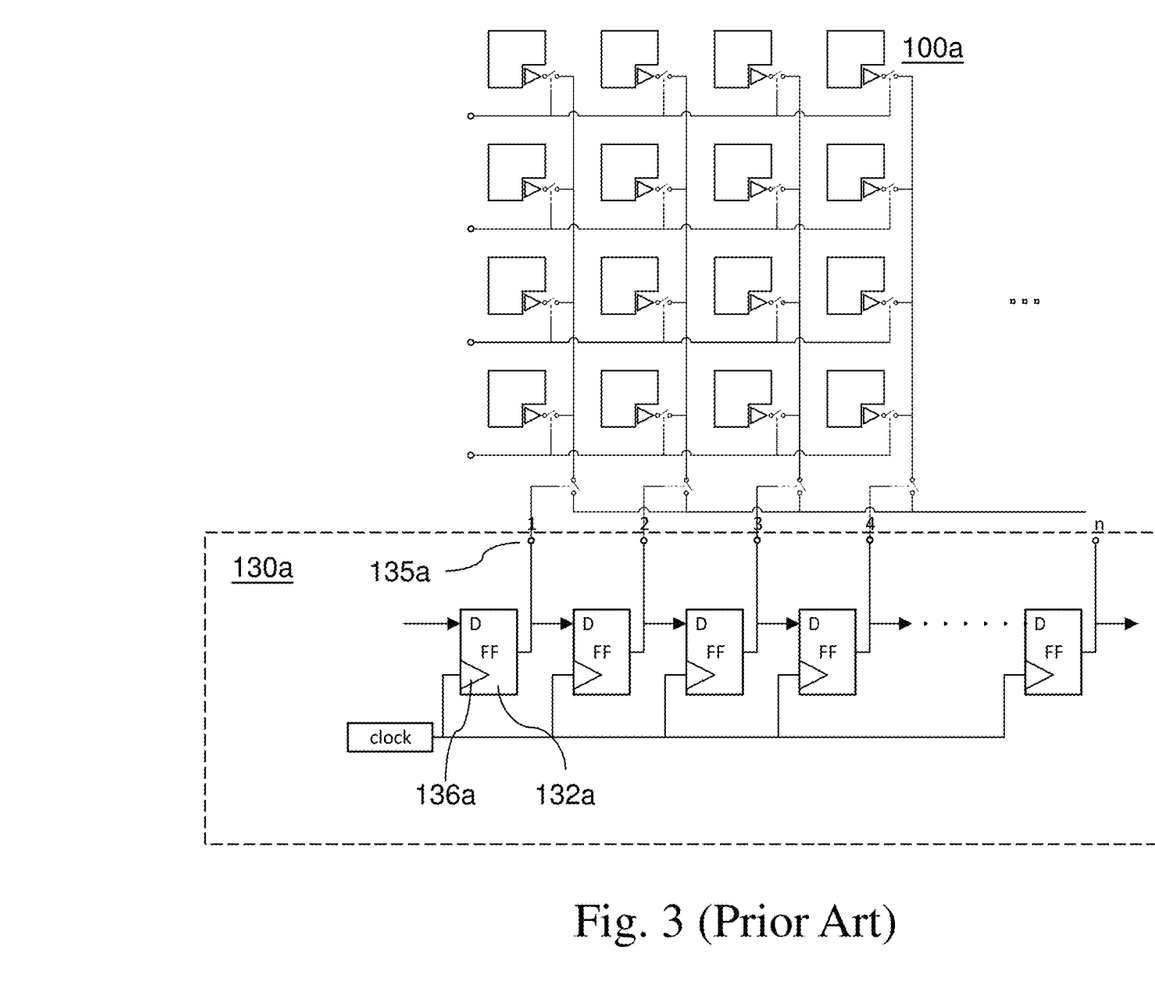
FIG. 3 shows a conventional activation circuit in the horizontal direction that controls the column select of a sensing array.

Please refer to FIG. 3. FIG. 3 shows a conventional activation circuit 130a in the horizontal direction that controls the selection of the columns of a sensing array 100a. The activation circuit 130a is a shift register that consists of a set of cascaded flip-flops (FF) 132a. Each flip-flop 132a includes an input node (D), a clock node 136a, and an output node 135a. The output of each flip-flop 132a is connected to the input of the next flip-flop 132a, and the corresponding nodes of the column select of the sensing array 100a. The numbers, 1-to-n of the output nodes, indicate the corresponding columns controlled by the activation circuit. During the initialization stage, all the flip-flops are cleared to 0 (disabling the row or column). The input node D of the first flip-flop is set to 1 when the first clock arrives and then cleared to 0 so that a single bit 1 enters the shift chain and propagates towards the end upon subsequent clocking. Therefore, the sensing array 100a is enabled column-by-column. The conventional activation circuit has another shift register in the vertical direction (not shown) that controls the row select thereof. Thus, the measurement signal is sent out pixel-by-pixel in the horizontal direction, and row-by-row in the vertical direction. A shift register that consists of cascaded flip-flops is a well-known basic structure of electronic devices and will not be described further here.

Figure 4:
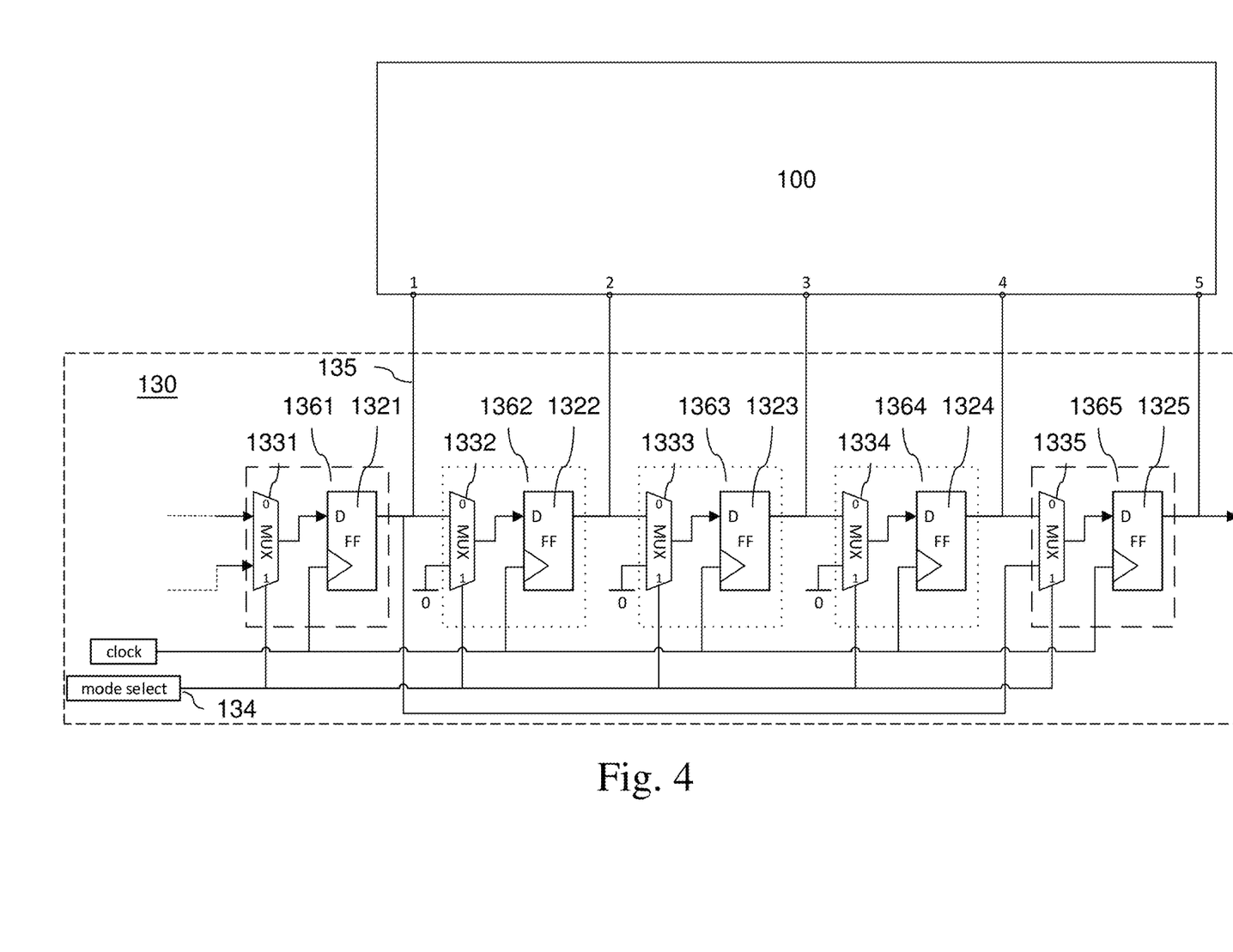
FIG. 4 shows a portion of an activation circuit and the array of sensing pixels controlled by the activation circuit in the present embodiment.

Please refer to FIG. 4. FIG. 4 shows a portion of an activation circuit 130 and the array of sensing pixels 100 controlled by the activation circuit 130 in the present embodiment. The same structure of flip-flops interlaced with MUXs may repeat throughout the entire flip-flop chain. Unlike the conventional activation circuit 130a that simply composed of cascaded of flip-flops 132a, the activation circuit 130 in the present embodiment includes a series of flip-flops with a selective activation circuit 131 (refer to FIG. 1). The selective activation circuit 131 and the profiling logic 160 are designed to match specific requirements of the image sensing device. This paragraph focuses on the selective activation circuit 131, and the profiling logic 160 is described in later paragraphs. The selective activation circuit 131 includes a series of multiplexers (MUXs 1331-1335) and a mode select signal 134. Different from the conventional activation circuit 130a where the basic unit of the sequential logic controlling the output of a column or a row is a flip-flop 132a, the basic unit of the sequential logic in the present embodiment is a combination of an FF 1322 and a MUX 1332. There are two types of basic units, normal basic units and selective basic units, where the name is corresponding to the mode of the image sensing device. In normal mode, the shifting bit "1" will propagate through both normal and selective basic units. In the selective mode, the shifting bit "1" will propagate through only the selective basic units. FIG. 4 shows two selective basic units (1361 and 1365) enclosed by dashed rectangles and three normal basic units (1362, 1363, and 1364) enclosed by dotted rectangles. The structure of the normal basic unit and the selective basic unit is slightly different. Take the perspective of the second MUX 1332 and the second FF 1322 as an example of a normal basic unit. The MUX 1332 has two input nodes, one output node, and a selecting node. The first input node (node selected by 0) of the MUX 1332 is connected to the output node of the "previous" FF 1321. The second input node (node selected by 1) is connected to a logical "0" signal. The selecting node is connected to the mode select signal 134. The output node is connected to the input node of the "next" FF 1322. When the mode select signal 134 is set to logical "0", the signal of the "previous" FF 1321 will be sent to the "next" FF 1322 via the first input node of the MUX 1332. The activation circuit 130 works as a conventional activation circuit that the shifting bit "1" will propagate through the whole series of flip-flops. On the contrary, when the mode select signal 134 is set to logical "1", the MUX 1332 will send the signal of the second input node, i.e., logical "0", to the "next" FF 1322. The output signal of the FF 1321 will be sent to the FF 1325 via the MUX 1335. In other words, the propagation of the shifting bit "1" will skip some of the flip-flops, i.e., the normal basic units 1362-1364. Take the perspective of the fifth MUX 1335 and the fifth FF 1325 as an example of a selective basic unit. The second input node (node selected by 1) is connected to the output node of the "previous" selective basic unit 1361, i.e., the output node of the FF 1321. When the mode select signal 134 is set to logical "1", the shifting bit "1" will skip the second, third, and fourth FF (1322 to 1324), and jump to the (N+1)$^{th}$ FF 1325 (N=4 in this example). The dashed line of the input of the MUX 1331 indicates that the connection of the MUX 1331 to a "previous" selective basic unit is the same as the connection between the first basic unit 1361 and the fifth basic unit 1365. Using this method, the column connected to the selective activation circuit 131 can be controlled (enabled or disabled) by the mode select signal 134. The output node of the first FF 1321 is also connected to the node 135 of the column select to enable or disable the corresponding column. The connection rule of the selective activation circuit 131 is based on the specific requirement of the image sensing device 10.

Figure 5:
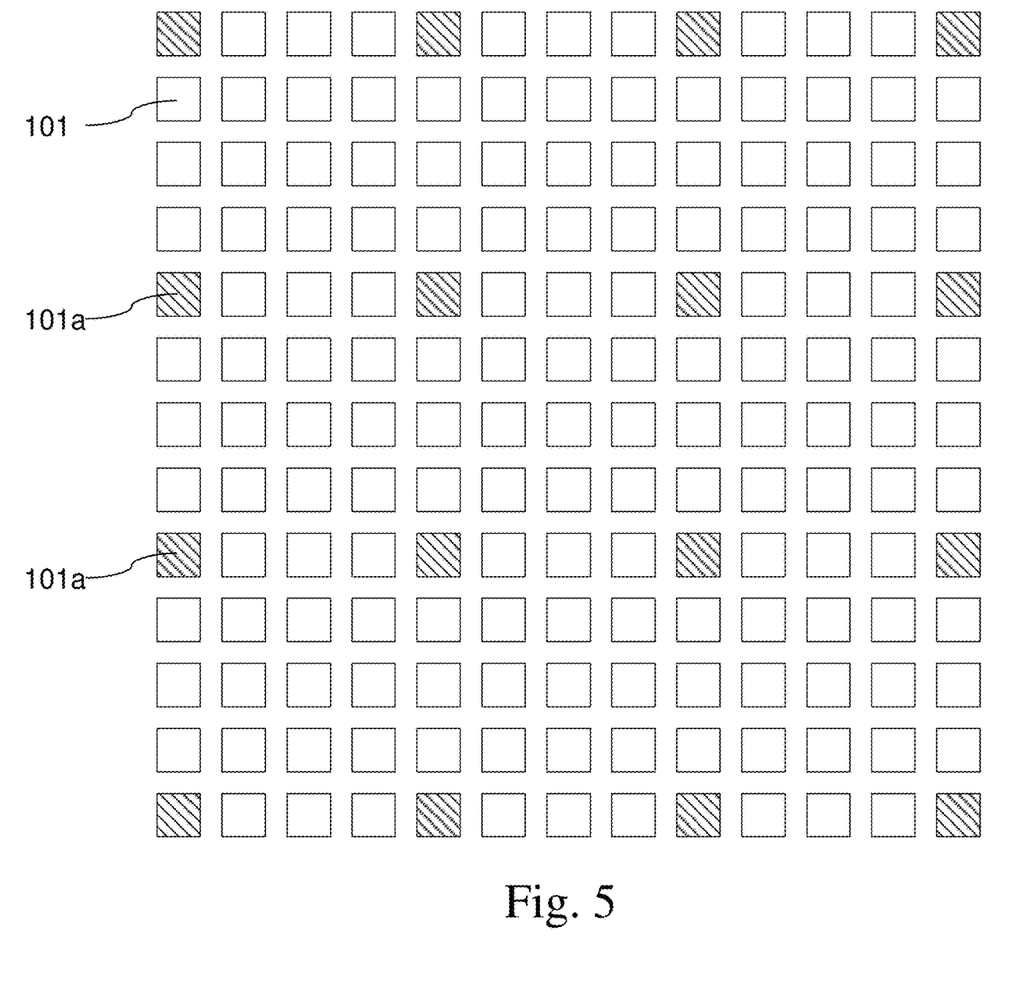
FIG. 5 shows a portion of the array of sensing pixels.

Please refer to FIG. 4 and FIG. 5. FIG. 5 shows a portion of the array of sensing pixels 100 controlled by the activation circuit 130 in FIG. 4. Among the 13×13 pixels shown in FIG. 5, a subset of the pixels 101a (boxes with diagonal stripes) is the "area of interest" of the array of sensing pixels 100. The "area of interest" is the upper-left pixel in every N×M pixel array (N=M=4 in this example). In other words, the "area of interest" is a sub-sampling of the array of sensing pixels 100. Here, the "selective mode" means a sub-sampling mode. This is based on the requirement of the image sensing device 10 that statistics are generated using data of these pixels. When the mode select signal 134 is set to "1", the image sensing device 10 is set to "selective mode" that only the subset of pixels 101a send output data. When the mode select signal 134 is set to "0", the image sensing device 10 is set to "normal mode" that all pixels of the array of sensing pixels 100 send output data. In other words, the image sensing device 10 switches between normal and selective modes through the mode select signal 134 in FIG. 4. In another example, the selective activation circuit 131 may have a different structure. In still another example, the image sensing device 10 may have multiple selective modes.

Please refer to FIG. 6. FIG. 6 shows four data sets captured by the subset of the pixels 101a under different parameter settings. The images captured by the image sensing device 10 under corresponding circumstances are shown on the right side of that data set. The dashed rectangle represents the area of the array of sensing pixels 100. In the present embodiment, the image sensing device 10 is a fingerprint sensor generating 8-bit depth images. The visualized data set is the histogram of the 1/16 sub-sampling image acquired by the array of sensing pixels 100. Unlike a conventional image sensor, which captures a full-size image before the adjustment of the parameters, the image sensing device 10 utilizes the sub-sampling data to adjust the parameters to operate the image sensing device, e.g., gain and offset. This method can reduce the computing power and/or storage requirement to get a high-quality image. The sub-sampling data is sent to the profiling logic 160 to calculate a set of statistics. FIG. 6(A) shows a typical histogram of a high-quality image of a fingerprint image, which has a high-contrast without over-saturation. A quantitative method is to measure the 10$^{th}$ percentile ($P_{10}$) and the 90$^{th}$ percentile ($P_{90}$) of the sub-sampling data. The dashed-lines and dashed-dot-lines in FIG. 6(A) to FIG. 6(D) show the value of $P_{10}$ and $P_{90}$, respectively. If the value of $P_{10}$ is too low, e.g., less than 5, or the value of $P_{90}$ is too high, that means the image is oversaturated. If the difference between P10 and P90 is not enough, e.g., less than 128, that means the image has low contrast. Based on these statistics, the profiling logic 160 adjusts corresponding parameters stored in the first set of registers until the requirements of the statistics are matched. And then, send out the image captured under normal mode. A target standard to fulfill the requirements may define by (one or more) threshold values or ranges that are stored in the profiling logic 160. When all statistics reach the threshold values or ranges, the statistical analysis results reach the target standard. The method used in the profiling logic 160 is not limited to the method described above. Various statistical indicators can be used to indicate the different statuses of the image sensing device 10.

Figure 6A:
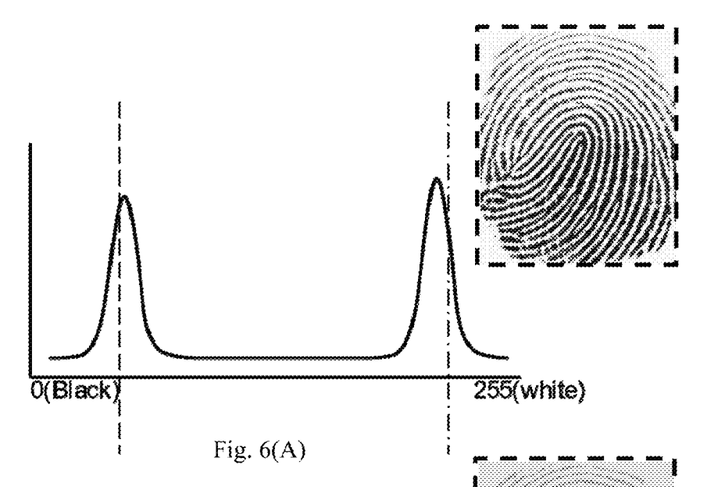
FIG. 6 shows four visualized data sets captured by the subset of the pixels under different circumstances.
Figure 6B:
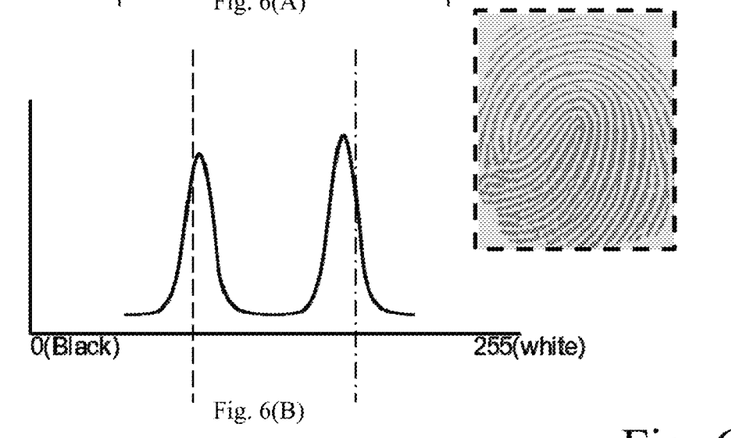
Figure 6C:
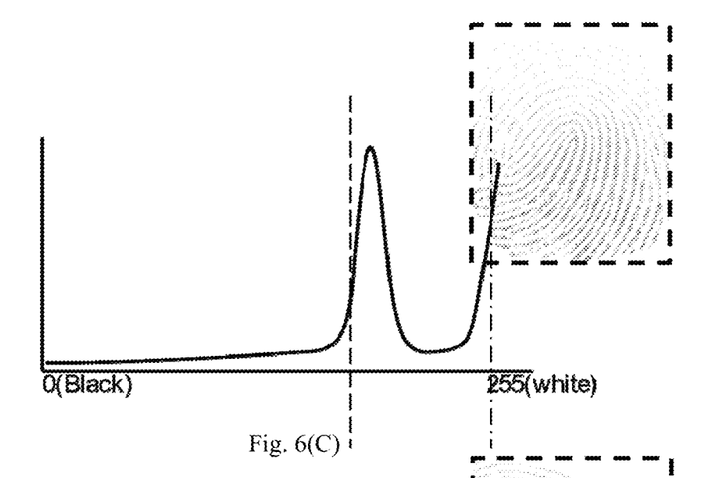
Figure 6D:
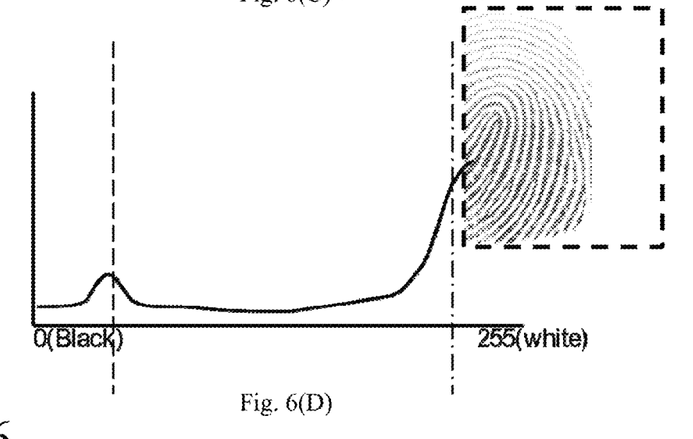

FIG. 6(B) to FIG. 6(D) show the histograms of three typical low-quality images. FIG. 6(B) shows the histogram of a sub-sampling low-contrast image. The profiling logic sends out a signal to increase the gain value of the output amplifier 140 which may increase the image quality. FIG. 6(C) shows an example of an oversaturated image, and changing the offset may increase the image quality. FIG. 6(D) shows a particular case that a user's fingertip is put on the array of sensing pixels 100, but does not fully contact with the surface of the sensor or does not fully cover the area of the array of sensing pixels 100. The contrast of these kinds of images is quite high, but the gray level of lots of pixels is quite low. Therefore, the statistics may be used to notify a user to move his/her fingertip to get a clearer image.

Figure 7:
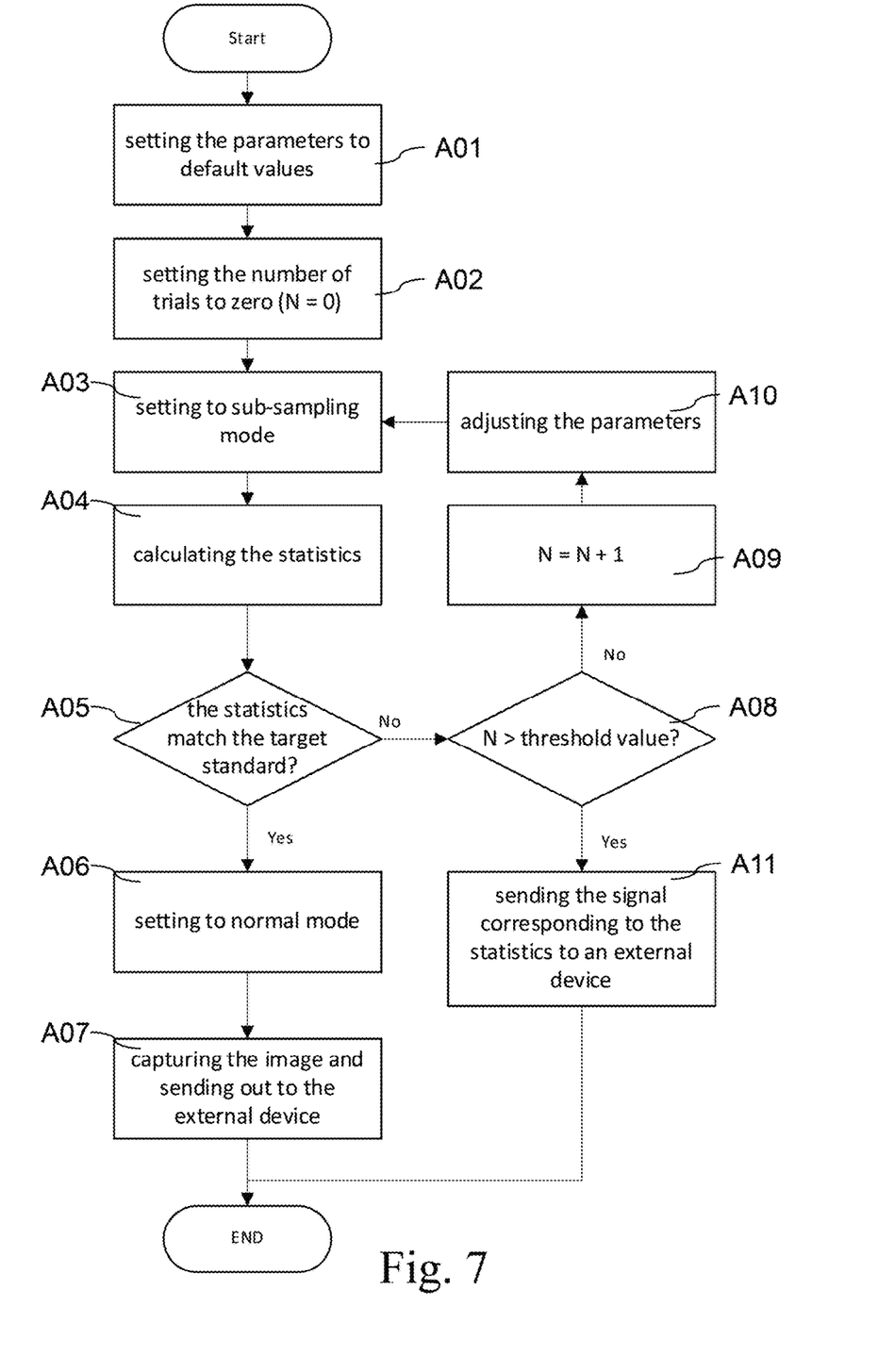
FIG. 7 shows a flowchart to operate the image sensing device according to the present invention.

Please refer to FIG. 7. FIG. 7 shows a flowchart to operate the image sensing device 10 according to the present invention. First, setting the parameters in the first set of registers 110 to default values (A01). Second, setting the number of trials to zero (N=0) (A02), and setting the image sensing device 10 to sub-sampling mode (mode select=1) (A03). Then, the profiling logic 160 calculates the statistics based on the sub-sampling data (A04). In the next step, it is determined whether the statistics match predetermined target standard (A05). If the statistics match the target standard, the image sensing device 10 is set to normal mode (A06), and then the image is captured and sent out to the external device (A07). If the statistics do not match the target standard, it is determined whether the number of trials N exceeds a threshold value (A08), e.g., five times. If N exceeds the threshold value, the signal corresponding to the statistics is sent to an external device to indicate a failure (A11). Otherwise, N is increased by 1 (A09) and the parameters are adjusted according to the statistics (A10), and then the process is repeated.

Figure 8:
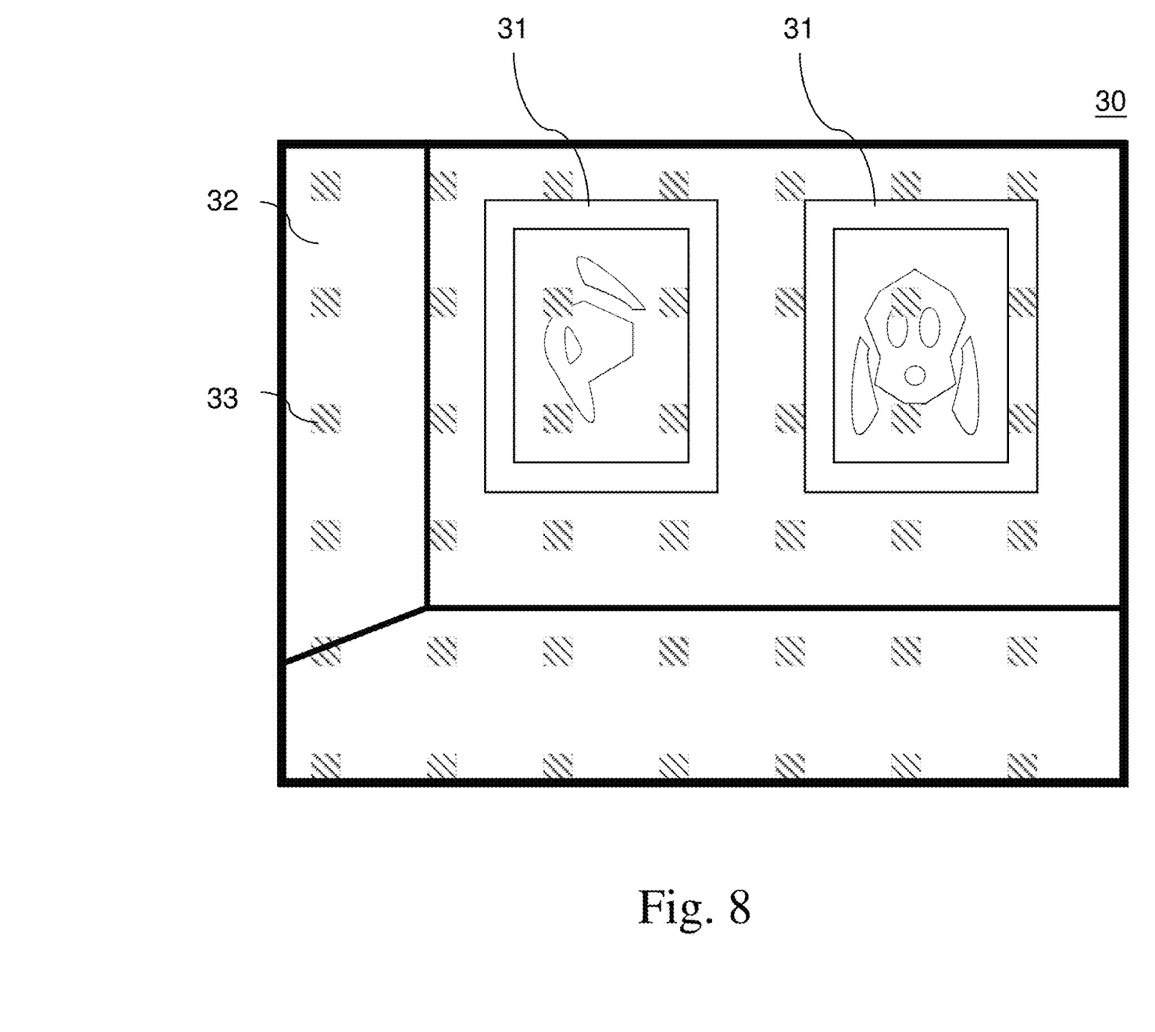
FIG. 8 shows a schematic diagram of an image shown on an image sensing device in a second embodiment.

Please refer to FIG. 8. FIG. 8 shows a schematic diagram of an image read by an image sensing device in a second embodiment. In this embodiment, the image sensing device is a surveillance camera 30. Similar to the previous embodiment, the area of interest 33 (pixels marked with diagonal stripes) is a subset of pixels evenly distributed over the array of sensing pixels 32. The surveillance camera 30 targets to several paintings 31 at a corner of a gallery. During a "hibernating mode" (selective mode), only those pixels of the area of interest 33 are activated. Output data of the activated pixels are sent to the profiling logic 160. When the statistics calculated by the profiling logic 160 based on the output data meet the requirements, the image sensing device 10 is set to "normal mode." For example, the profiling logic 160 monitors the change of average brightness of the area of interest 33, and sets the image sensing device 10 to the "normal mode" when the average brightness shifts significantly. Therefore, only very few pixels of the image sensing device are activated during the "hibernating mode," and the image sensing device wakes-up when it detects changes in its view. The statistics calculated by the profiling logic 160 are not limited to the brightness; it may be other factors used in the field of image processing or computer vision.

Figure 9:
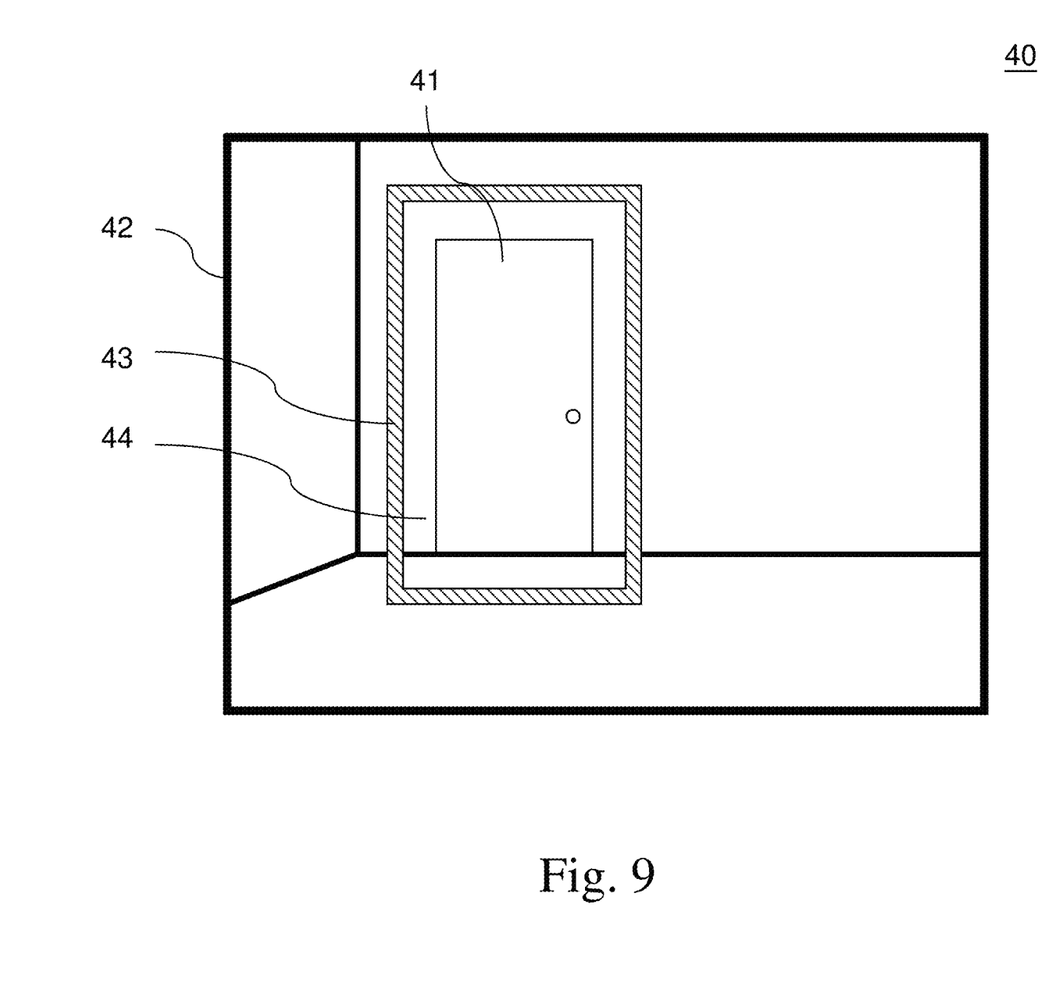
FIG. 9 shows a schematic diagram of an image shown on an image sensing device in a third embodiment.

Please refer to FIG. 9. FIG. 9 shows a schematic diagram of an image shown on an image sensing device in a third embodiment. In this embodiment, the image sensing device is a surveillance camera 40 targeting to an entrance door 41. One captured image 42 and a region of interest (ROI) 43 are shown in FIG. 9 to describe this embodiment. Unlike the area of interest 33 in the previous embodiment, which is evenly distributed over the array of sensing pixels 32, a region of interest (ROI) 43 in the present embodiment is a frame enclosing a target area 44. The target area 44 includes at least the entrance door 41. The frame has a specific width, e.g., ten pixels, to ensure that the data size is big enough for the profiling logic 160 to operate properly. The activation circuit 130 in the present embodiment is programmable, i.e., each pixel in the array of sensing pixels 100 is able to set to the ROI or not. Therefore, a user may adjust the size and location of the target area 44. All pixels except those in the ROI are deactivated in a "hibernating mode." The selective activation circuit 131 activates only the pixels in the ROI, and data of the pixels in the ROI are sent to the profiling logic 160. When the statistics calculated by the profiling logic 160 based on the output data from the ROI meets the requirements, e.g., exceed the thresholds, the image sensing device 10 is set to "normal mode," which all sensing pixels are activated to send out data for capturing an image. The statistics may reflect the color or brightness shift received by the pixels of the ROI. In other cases, the statistics may also reflect the wavelength or intensity shift received by the pixels of the ROI.

What is claimed is:

1. An image sensing device, comprising:
an array of sensing pixels;
an output amplifier, connected to the array of sensing pixels, for amplifying a measurement signal of each sensing pixel of the array of sensing pixels;
an analog-to-digital converter (ADC), connected to the output amplifier, for converting the amplified measurement signal of each sensing pixel of the array of sensing pixels into digital data;
a first set of registers, for storing parameters to operate the image sensing device that control the output amplifier;
a second set of registers, connected to the ADC, for storing the digital data converted by the ADC;
an activation circuit, connected between the array of sensing pixels and the output amplifier, for controlling output sequence of the array of sensing pixels, including a selective activation circuit to selectively enable an output of a subset of the array of sensing pixels; and
a profiling logic, connected to the first and second sets of registers, for performing the followings:
conducting statistical analysis on output data from the subset of the array of sensing pixels;
adjusting the parameters stored in the first set of registers until results of the statistical analysis reaches a target standard;
using the adjusted parameters to generate an output image by each sensing pixel of the array of sensing pixels once the target standard is reached; and
sending a notification signal to an external device for notifying the failure of parameter adjustment if the target standard fails to be reached within predetermined times of adjustment,
wherein the activation circuit comprises a plurality of basic units, and wherein each of the plurality of basic units comprises a flip-flop and at least one multiplexer.

2. The image sensing device according to claim 1, wherein the measurement signal of each sensing pixel represents an electric potential or an electric current thereof.

3. The image sensing device according to claim 1, wherein the parameters to control the output amplifier are gain and offset.

4. The image sensing device according to claim 1, wherein the subset of the array of sensing pixels is a sub-sampling of the array of sensing pixels.

5. The image sensing device according to claim 1, wherein the selective activation circuit corresponding to the subset of the array of sensing pixels is controlled by a mode select signal.

6. The image sensing device according to claim 5, wherein the image sensing device switches between normal and selective modes through the mode select signal, wherein a shifting bit is propagated through each of the plurality of basic units in the normal mode and is propagated through only among selective basic units in the selective mode.

7. The image sensing device according to claim 6, wherein multiple selective modes are provided corresponding to respective specified subsets of the array of sensing pixels, and each mode is activated by a corresponding mode select signal.

8. The image sensing device according to claim 1, further comprising an I/O interface for communicating with the external device.

9. The image sensing device according to claim 1, wherein the image sensing device is a fingerprint sensor.

10. The image sensing device according to claim 9, wherein the fingerprint sensor is a capacitive fingerprint sensor.

* * * * *